United States Patent [19]
Dachs et al.

[11] B 3,928,688
[45] Dec. 23, 1975

[54] PRINTING FIBROUS MATERIAL

[75] Inventors: Karl Dachs, Frankenthal; Gerhard Faulhaber, Mannheim; Rolf Fikentscher, Ludwigshafen; Knut Oppenlaender, Ludwigshafen; Joachim Schulze, Ludwigshafen, all of Germany

[73] Assignee: Badische Anilin- & Soda-Fabrik Aktiengesellschaft, Ludwigshafen (Rhine), Germany

[22] Filed: June 2, 1972

[21] Appl. No.: 259,274

[44] Published under the Trial Voluntary Protest Program on January 28, 1975 as document no. B 259,274.

[30] Foreign Application Priority Data
June 11, 1971 Germany............................ 2128904

[52] U.S. Cl. ................ 428/515; 427/288; 428/521; 260/17 R; 260/17.4 ST; 260/29.6 RW
[51] Int. Cl.²............................................ D06P 1/00
[58] Field of Search........ 117/15, 139.5 A, 139.5 C, 117/161 UA, 164, 165, 166, 38; 260/8, 17 R, 17.4 ST, 29.6 RW, 613 B; 427/288; 428/515, 521; 427/288; 428/515, 521

[56] References Cited
UNITED STATES PATENTS

| | | | |
|---|---|---|---|
| 2,696,168 | 12/1954 | Costello............................ | 117/15 X |
| 3,138,567 | 6/1964 | Abrams et al. .................... | 117/38 X |
| 3,140,194 | 7/1964 | Gagliardi ............................. | 117/15 |
| 3,162,611 | 12/1964 | Varron et al. .................... | 117/38 X |
| 3,657,175 | 4/1972 | Zimmerman....................... | 260/29.6 |
| 3,694,241 | 9/1972 | Guthrie et al......................... | 117/15 |

FOREIGN PATENTS OR APPLICATIONS

| | | | |
|---|---|---|---|
| 1,121,814 | 1/1962 | Germany ............................ | 260/29.6 |

OTHER PUBLICATIONS
Chemical Abstract, Vol. 72, 1970, Sec. 67632n, p. 30.

*Primary Examiner*—Michael R. Lusignan
*Attorney, Agent, or Firm*—Johnston, Keil, Thompson & Shurtleff

[57] ABSTRACT

A method of printing fibrous materials using a print paste incorporating as emulsifier a di-($\alpha$-phenylethyl)-phenol which has been oxyethylated from twelve to sixteen times.

5 Claims, No Drawings

PRINTING FIBROUS MATERIAL

The invention relates to an improved process for printing textile fibrous materials.

Prior art pigment printing methods generally use print pastes consisting essentially of an oil-in-water emulsion which contains the pigment, a binder based on polymer dispersions, thickeners of natural or synthetic origin and emulsifiers usually based on oxyalkylated phenols.

One of the many problems which is always recurring in the said textile printing methods consists in the choice of adequately effective emulsifiers which have the task of forming the oil-in-water emulsion and keeping it in stable condition.

Stability in storage and shear stability of the finished emulsion are also of particular importance in these textile finishing methods.

Emulsions are physical liquid-liquid mixtures which are present in homogenized phase, i.e., the emulsified particles are contained in equal amounts at all parts of the mixture. The emulsion may break by separation of the heavier liquid particles from the lighter liquid particles, i.e., in the case of an oil-in-water emulsion the oil rises to the surface of the liquid-liquid mixture, a phenomenon known as creaming. An emulsion which does not exhibit this phenomenon after prolonged standing is known as stable in storage.

Another possibility of an emulsion breaking consists in vigorous movement of the system in which, caused by the different inertias of the particles, the latter are accelerated to different extents and are thus separated. Resistance to this type of separation is known as shear stability.

Different emulsions, particularly oil-in-water emulsions, generally involve different problems in practise.

For example it is required of a plant protection formulation that only very little, i.e., not more than 5% of an organic phase (based on the emulsion) has to be emulsified in water and the resultant emulsion does not need to be resistant to shear because it is known that the formulation will be sprayed in a very short time. Moreover the emulsifier need not have too high an effectiveness because it has only to keep a small amount of organic phase in stable emulsion.

Emulsifiers suitable for the process of the invention are generally not of ionic type and are based on oxyalkylated compounds bearing active hydrogen atoms. Oxyalkylated long chain alkylphenols hitherto used in textile printing have proved to be particularly suitable.

Similar methods are followed in plant protection, attempts being made also with oxyalkylated phenol derivatives to achieve the abovementioned objects for plant protection.

German Pat. No. 1,121,814 for example discloses special condensation products of styrene with phenol, the OH group of the condensed phenol being oxyethylated.

The di-($\alpha$-phenylethyl)-phenol according to Example 1 of the said patent is oxyethylated ten times and may be used with good results as an emulsifier.

In the various Examples of the said patent it is apparent that the degree of oxyethylation is a direct function of the hydrophobic organic base material. In other words, the degree of oxyethylation is higher when the phenol compound used contains more organic (i.e., hydrophobic) groups. The compounds described in this literature reference are accordingly phenol derivatives which may be oxyethylated 10 to 20 times. The Examples show that the product di-($\alpha$-phenylethyl)-phenol is most effective when it has been oxyethylated 10 times.

According to past experience an increase in the degree of oxyethylation results in the phenomenon that the emulsifier becomes more and more soluble in water, i.e., it is increasingly less capable of keeping an organic phase in stable emulsion by reason of the lower percentage content of hydrophobic groups. Such highly oxyethylated products then have the reverse effect, i.e., as an emulsion breaker.

The object of the present invention is to provide a stable oil-in-water emulsion in which the ratio of water to oil may extend over a very wide spectrum and in which a proportion of up to 80% of organic substance (oil) is no rarity. It is obvious that an emulsifier which has to keep such a system emulsified has to have a particularly predominant ratio of hydrophobic groups to hydrophilic groups because otherwise an emulsion once formed would be immediately broken on prolonged standing or even upon vigorous shear stress. In this connection reference is made to the fact that particularly in the case of petroleum emulsion breakers the said instability to shear of highly oxyethylated products is made use of to break into an oil phase and a water phase freshly extracted petroleum on the way from the oilfield to the refinery.

Emulsifiers which have hitherto been intended to fulfill this object in textile printing have hitherto generally been oxyalkylated phenols, particularly of nonylphenol and dodecylphenol. The disadvantage hitherto associated with these compounds has consisted, as already stated above, in the fact that the increased requirements as regards shear stability, based on modern high-speed machines and short liquor methods, cannot be fulfilled to the desired extent. Moreover, the long-chain alkylphenols generally had to be fairly highly oxyalkylated so that the abovementioned well balanced ratio of hydrophobic radicals to hydrophilic radicals was ensured.

According to a prior proposal (German Printed Application No. P 1,951,131) an attempt has been made to obviate these difficulties by using polyglycol ethers of mononuclear phenols bearing at least two alkyl groups as substituents on the phenol ring.

The desire to develop still more useful compounds with which emulsions of high shear stability could be prepared seemed to be rather pointless since it appeared that the shear stability would decline considerably with a slight increase in the degree of oxyethylation, i.e., with only a slight disturbance of the well balanced ratio of hydrophilic to hydrophobic groups. For example it may be said that an alkylphenol oxyethylate which has been oxyethylated twenty times so that a fairly good shear stability is achieved, exhibits inferior properties at a degree of oxyethylation of 25.

The solution is surprisingly achieved with a process for printing fibrous materials with print pastes which are based in known manner on an oil-in-water emulsion, a pigment, a thickener, a pigment binder and an emulsifier of the oxyethylated phenol derivative type, which comprises adding to the pigment binder, as an emulsifier, 0.1 to 1.5% by weight (based on the finished print past) of a di-($\alpha$-phenylethyl)-phenol which has been oxyethylated 12 to 16 times.

The feature of the present invention is the more surprising since it is disclosed in the abovementioned German Pat. No. 1,121,814 that optimum emulsification is to be achieved at a degree of oxyethylation of 10. Moreover the optimum oxyethylation is achieved in the field of plant protection where less stringent requirements are known to exist, and cannot be increased any more. The surprising thing is that an oxyethylation degree of from 12 to 16 should represent the optimum emulsifier with which it is possible to achieve practically unlimited shear and storage stability of a print paste emulsion.

The pastes forming the basis of the process according to the invention are generally oil-in-water emulsions consisting of water and an organic solvent or solvent mixture which is not miscible with water and which has a boiling temperature of from 80° to 200° C. Examples of these solvents are hexanes, heptanes, nonanes, cyclohexylbenzenes, toluenes, xylenes, and gasoline fractions of from 80° to 200° C or mixtures of the same. A gasoline of the middle oil fraction is particularly suitable.

The pastes forming the basis of the process of the invention contain emulsion thickeners as well as water and the said solvents. These are usually thickeners which are soluble or which swell in water such as alginates, carob flour ether, starch ethers or carboxymethylcellulose. Examples of particularly effective emulsion thickeners are synthetic thickeners such as are proposed in German Printed Application P 2,054,885. These emulsion thickeners are derived from polyoxyalkylated diisocyanates They are described in the said patent in detail and may be used in the same amounts in the print pastes forming the basis of the process of this invention. The print pastes contain about 0.02 to 1%, preferably from 0.05 to 0.5%, by weight (based on the finished print paste) of the said thickeners depending on the desired viscosity.

Moreover the print pastes in accordance with the invention contain the emulsifier consisting of di-($\alpha$-phenylethyl)-phenol which has been oxyethylated from 12 to 16, preferably from 14 to 15, times. These compounds may be easily prepared by a conventional method from phenol and styrene followed by reaction of the intermediate with the stoichiometric amount of ethylene oxide.

In this connection it is also surprising that these low precentages of 0.1 to 1.5% by weight are sufficient to keep the emulsion stable. In the case of plant protection formulations at least 2% is required.

So far it is not clear why these small percentages are sufficient to keep an emulsion stable for this purpose. The reason may be an unknown synergistic effect produced together with the other ingredients of such a print paste.

The print pastes also generally contain a binder conventionally used for textile printing such as are described in detail in German Pat. No. 1,140,898. For the synthesis of the binder there are preferably used monomers which yield soft and elastic copolymers at room temperature, for example vinyl esters of higher carboxylic acids such as vinyl propionate, acrylic esters, methacrylic esters, such as methyl, ethyl, or butyl acrylate, or butyl methacrylate and also butadiene or homologs thereof. These are polymerized alone or mixed together or copolymerized with other monomers, for example with maleic esters, fumaric esters, vinyl ethers, vinyl ketones, styrene, vinyl chloride, vinylidene chloride, vinyl acetate, acrylonitrile or methyl methacrylate. Small amount of water-soluble polymerizable compounds such as acrylic acid, vinylpyrrolidone, amides of unsaturated acids or the N-methylol compounds or N-methylol ethers of these amides may also be contained therein in polymerized form. They may also contain other comonomers which contain at least one polymerizable double bond, for example esters of $\beta$-unsaturated organic acids such as acrylic or methacrylic acid with higher alcohols which have a halogen atom in the $\beta$-position to a free hydroxyl group, for example di-3-chloropropanediol-(1,2), 2,3-dichlorobutanediol-(1,4), 3-chlorobutanediol-(2,4), 1,4-dichlorobutanediol-(2,3), 3-chloro-2-methyl-propanediol-(1,2) or 3-chloro-2-chloromethyl-propanediol-(1,2). The ratio in which these monomers and comonomers are mixed and the percentage thereof contained in the print pastes may be chosed exactly as these amounts are given in German Pat. No. 1,140,898.

The abovementioned solvents for the production of the oil-in-water emulsions may also contain from 0.01 to 0.15% by weight (based on the finished print paste) of a defoamer, especially a defoamer such as is specified in U.S. Pat. application Ser. No. 234,991. These are derivatives of block copolymers of ethylene oxide and/or 1,2-propylene oxide which have been etherified with polyhydric alcohols and also esterified with carboxylic acids.

The emulsion thickener required for the print paste may be prepared for example by stirring the solid products, for example the thickener, into the emulsifier solution, allowing them to swell and then emulsifying into the same by stirring the solvent which contains the emulsifier to be added according to the invention. The procedure may also be that a liquid mixture of the thickening agent, the emulsifier to be added according to the invention and some water is prepared and this mixture is used in the production of the emulsion thickening.

Other alkylphenol or arylphenol oxyethylates may in some cases also be added together with the emulsifier to be added according to the invention.

Conventional thickeners, for example alginates, starch ethers or carboxymethylcellulose may also be incorporated into the print pastes according to the invention.

The finished print pastes are obtained by a conventional method by stirring together the emulsion thickener (which contains water, solvent, emulsifier to be added according to the invention, thickening agent and if desired defoamer), the pigment or pigment formulation, one of the said binders with or without additional thickening agents and other print paste constituents conventionally used. It is also possible however for some of the print paste constituents to be supplied to the aqueous emulsifier solution prior to the solvent being emulsified in. A print paste which is too mobile may also have the thickening agent added to it subsequently.

Specifically the print paste according to the invention may be prepared for example by first preparing a thickener emulsion by mixing with vigorous stirring the emulsifier according to the invention, an emulsion thickening agent, water and kerosene in which if desired a defoamer, for example according to U.S. Pat. application Ser. No. 234,991 is dissolved.

A finished pigment paste for roller printing is obtained for example by stirring together 60 parts of a pigment formulation (30% of pigment), 790 parts of the thickener emulsion described above, 120 parts of a pigment binder based on one of the abovementioned copolymers in the form of a dispersion and if desired 10 to 40 parts of an aqueous solution, for example 33.3%, of diammonium hydrogen phosphate as acid donor.

The print pastes according to the invention result in very level and bright prints. The quality of the prints is excellent both in screen printing and roller printing. The print pastes are therefore particularly suitable for rotary screen printing. One advantage of the print pastes according to the invention is that in addition to the small amounts of emulsion thickening agents such as are described for example in German Printed Application P 2,054,885, the print pastes are stable in storage and shear and in the case of mobile formulations are low in foam. The addition of defoamers surprisingly does not affect the emulsion.

The print pastes forming the basis of the process according to the invention may be used particularly for pigment printing on for example cotton, staple fiber, and other natural and synthetic fibers. It is also possible however to prepare the print pastes according to the invention for example with conventional dyes such as disperse dyes or reactive dyes. The parts and percentages specified in the Examples are by weight.

EXAMPLE 1

145 parts of water is mixed with 50 parts of a 7% aqueous solution of sodium alginate and 5 parts of di-($\alpha$-phenylethyl)-phenol which has been reacted with 14 moles of ethylene oxide. This mixture has slowly added to it with intense stirring (about 3,000 rpm) 650 parts of mineral spirit and then 150 parts of a 40% aqueous dispersion of a copolymer of 70 parts of ethyl acrylate and 30 parts of styrene. A very stable oil-in-water emulsion is obtained which, when a pigment is added to it, gives a print paste which retains its stability even under extreme shear stress.

EXAMPLE 2

The following are mixed as described in Example 1: 150 parts of water, 10 parts of di-($\alpha$-phenylethyl)-phenol which has been reacted with 15 moles of ethylene oxide, 100 parts of the polymer dispersion described in Example 1 and 40 parts of a 25% solution of diammonium phosphate in water. An oil-in-water emulsion is obtained having high resistance to shear stress and which is also entirely stable to the fairly high electrolyte content. This is a special prerequisite for discharge printing with pigments.

EXAMPLE 3

5 parts of sodium polyacrylate (molecular weight about 200,000) is dissolved in 277 parts of water. 5 parts of di-($\alpha$-phenylethyl)-phenol which has been reacted with 14 moles of ethylene oxide, 10 parts of urea and 3 parts of diammonium phosphate are added and the whole is homogenized by stirring. Finally while stirring vigorously (3,000 rpm) 500 parts of gasoline (boiling point 80° to 200° C) and 200 parts of a 40% aqueous dispersion of a copolymer of 65 parts of butyl acrylate, 24 parts of styrene, 6 parts of ethyl acrylate and 5 parts of N-methylolmethacrylamide are allowed to flow in. A very stable oil-in-water emulsion is obtained which is particularly suitable as a vehicle for pigments. The emulsifier used permits this print paste to be stirred for 2 hours by means of a stirrer of high shear intensity of 6,000 rpm without appreciable agglomeration of the dye. When reaction products of the same basic substance but with 11 or 18 moles of ethylene oxide are used, intense stirring stress produces a partial dye agglomeration which becomes evident in a visible decline in the brightness and color yield of the prints.

We claim:

1. In a process for printing fibrous material wherein a print paste consisting essentially of an oil-in-water emulsion of a pigment, a thickening agent, a pigment binder and emulsifier of the oxyalkylated phenol derivative type is applied to said fibrous material, the improvement which comprises the use as said emulsifier from 0.1 to 1.5% by weight based on the finished print paste of di-($\alpha$-phenylethyl)-phenol which has been oxyethylated from 12 to 16 times.

2. A process as set forth in claim 1 wherein the print paste has added to it a di-($\alpha$-phenylethyl)-phenol which has been oxyethylated 14 or 15 times.

3. A process as set forth in claim 1, wherein said paste also contains a defoamer.

4. Fibrous materials printed with a print paste comprising an oil-in-water emulsion of a pigment, a thickening agent, a pigment binder and an emulsifier from 0.1 to 1.5 percent by weight of di-($\alpha$-phenylethyl)-phenol which is oxyethylated from 12 to 16 times.

5. Fibrous material printed as in claim 4, wherein said emulsifier is a di-($\alpha$-phenylethyl)-phenol which has been oxyethylated 14 or 15 times.

* * * * *